United States Patent [19]
Chen

[11] Patent Number: 6,072,831
[45] Date of Patent: Jun. 6, 2000

[54] RATE CONTROL FOR STEREOSCOPIC DIGITAL VIDEO ENCODING

[75] Inventor: Xuemin Chen, San Diego, Calif.

[73] Assignee: General Instrument Corporation, Horsham, Pa.

[21] Appl. No.: 08/893,131

[22] Filed: Jul. 15, 1997

Related U.S. Application Data

[63] Continuation of application No. 08/674,859, Jul. 3, 1996, abandoned.

[51] Int. Cl.[7] .................................................. H04N 7/12
[52] U.S. Cl. ............................ 375/240; 348/43; 348/415
[58] Field of Search ................................ 348/43, 42, 397, 348/399, 400, 401, 403, 404, 405, 407, 408, 409, 411, 412, 415, 416; H04N 7/12

[56] References Cited

U.S. PATENT DOCUMENTS

| | | | |
|---|---|---|---|
| 4,884,131 | 11/1989 | Chevion et al. | 348/43 |
| 5,179,441 | 1/1993 | Anderson et al. | 348/43 |
| 5,349,383 | 9/1994 | Parke et al. | 348/397 |
| 5,418,571 | 5/1995 | Ghanbari | 348/416 |
| 5,515,377 | 5/1996 | Horne et al. | 348/415 |
| 5,596,321 | 1/1997 | Hekstra et al. | 348/409 |

OTHER PUBLICATIONS

T. Chiang et al., "A Rate Control Scheme Using A New Rate–Distortion Model," Document ISO/IEC JTC/SC29/WG11 MPEG 95/NO436, Nov. 1995, Dallas, Texas, USA.

"Test Model 5," Document AVC–491, ISO/IEC JTC1/SC29/WG11 MPEG93/457, Apr. 1993, pp. 61–65.

*Primary Examiner*—Young Lee
*Attorney, Agent, or Firm*—Barry R. Lipsitz; Ralph F. Hoppin

[57] ABSTRACT

Rate control in a stereoscopic digital video communication system is accomplished by modifying the quantization level of P or B-frame data in the enhancement layer depending on whether the frame is temporally predicted (from the same layer) or disparity predicted (from the opposite layer). The invention can maintain a consistent image quality by providing additional quantization bits for disparity-predicted P-pictures, for example, where a P-frame may be encoded from a B-frame in the enhancement layer. The selected quantization level corresponds to an overall bit rate requirement of the enhancement layer. For disparity predicted P-frames, the quantization step size is modified according to the activity level of the frame being encoded in the enhancement layer, or of the reference frame, whichever is greater. Also, image quality is improved and frame freeze up is prevented during editing modes such as fast forward and fast rewind which require random access to the picture data. When the reference frame in the base layer is the first frame of a group of pictures (GOP), the corresponding enhancement layer frame will be encoded as an I or P frame instead of as a B frame to improve image quality and eliminate or reduce error propagation during random access.

24 Claims, 6 Drawing Sheets

RATE CONTROL FOR STEREOSCOPIC DIGITAL VIDEO ENCODING

This application is a continuation of commonly assigned, U.S. patent application Ser. No. 08/674,859 filed Jul. 3, 1996, abandoned.

BACKGROUND OF THE INVENTION

The present invention relates to encoding of digital video signals. In particular, a method and apparatus are presented for encoding stereoscopic digital video signals to optimize image quality while maintaining bandwidth limitations. A method and apparatus for improving image quality when editing features such as fast-forward and reverse are invoked is also presented.

Digital technology has revolutionized the delivery of video and audio services to consumers since it can deliver signals of much higher quality than analog techniques and provide additional features that were previously unavailable. Digital systems are particularly advantageous for signals that are broadcast via a cable television network or by satellite to cable television affiliates and/or directly to home satellite television receivers. In such systems, a subscriber receives the digital data stream via a receiver/descrambler that decompresses and decodes the data in order to reconstruct the original video and audio signals. The digital receiver includes a microcomputer and memory storage elements for use in this process.

However, the need to provide low cost receivers while still providing high quality video and audio requires that the amount of data which is processed be limited. Moreover, the available bandwidth for the transmission of the digital signal may also be limited by physical constraints, existing communication protocols, and governmental regulations. Accordingly, various intra-frame data compression schemes have been developed that take advantage of the spatial correlation among adjacent pixels in a particular video picture (e.g., frame).

Moreover, inter-frame compression schemes take advantage of temporal correlations between corresponding regions of successive frames by using motion compensation data and block-matching motion estimation algorithms. In this case, a motion vector is determined for each block in a current picture of an image by identifying a block in a previous picture which most closely resembles the particular current block. The entire current picture can then be reconstructed at a decoder by sending data which represents the difference between the corresponding block pairs, together with the motion vectors that are required to identify the corresponding pairs. Block matching motion estimating algorithms are particularly effective when combined with block-based spatial compression techniques such as the discrete cosine transform (DCT).

However, an even greater challenge is posed now by proposed stereoscopic transmission formats such as the Motion Picture Experts Group (MPEG) MPEG-2 Multi-view Profile (MVP) system, described in document ISO/IEC JTC1/SC29/WG11 N1088, entitled "Proposed Draft Amendment No. 3 to 13818-2 (Multi-view Profile)," November 1995, incorporated herein by reference. Stereoscopic video provides slightly offset views of the same image to produce a combined image with greater depth of field, thereby creating a three-dimensional (3-D) effect. In such a system, dual cameras may be positioned about two inches apart to record an event on two separate video signals. The spacing of the cameras approximates the distance between left and right human eyes. Moreover, with some stereoscopic video camcorders, the two lenses are built into one camcorder head and therefore move in synchronism, for example, when panning across an image. The two video signals can be transmitted and recombined at a receiver to produce an image with a depth of field that corresponds to normal human vision. Other special effects can also be provided.

The MPEG MVP system includes two video layers which are transmitted in a multiplexed signal. First, a base layer represents a left view of a three dimensional object. Second, an enhancement (e.g., auxiliary) layer represents a right view of the object. Since the right and left views are of the same object and are offset only slightly relative to each other, there will usually be a large degree of correlation between the video images of the base and enhancement layers. This correlation can be used to compress the enhancement layer data relative to the base layer, thereby reducing the amount of data that needs to be transmitted in the enhancement layer to maintain a given image quality. The image quality generally corresponds to the quantization level of the video data.

The MPEG MVP system includes three types of video pictures; specifically, the intra-coded picture (I-picture), predictive-coded picture (P-picture), and bi-directionally predictive-coded picture (B-picture). Furthermore, while the base layer accommodates either frame or field structure video sequences, the enhancement layer accommodates only frame structure. An I-picture completely describes a single video picture without reference to any other picture. For improved error concealment, motion vectors can be included with an I-picture. An error in an I-picture has the potential for greater impact on the displayed video since both P-pictures and B-pictures in the base layer are predicted from I-pictures. Moreover, pictures in the enhancement layer can be predicted from pictures in the base layer in a cross-layer prediction process known as disparity prediction. Prediction from one frame to another within a layer is known as temporal prediction.

In the base layer, P pictures are predicted based on previous I or P pictures. The reference is from an earlier I or P picture to a future P-picture and is known as forward prediction. B-pictures are predicted from the closest earlier I or P picture and the closest later I or P picture.

In the enhancement layer, a P-picture can be predicted from the most recently decoded picture in the enhancement layer, regardless of picture type, or from the most recent base layer picture, regardless of type, in display order. Moreover, with a B-picture in the enhancement layer, the forward reference picture is the most recently decoded picture in the enhancement layer, and the backward reference picture is the most recent picture in the base layer, in display order. Since B-pictures in the enhancement layer may be reference pictures for other pictures in the enhancement layer, the bit allocation for the P and B-pictures in the enhancement layer must be adjusted based on the complexity (e.g., activity) of the images in the pictures. In an optional configuration, the enhancement layer has only P and B pictures, but no I pictures.

The reference to a future picture (i.e., one that has not yet been displayed) is called backward prediction. There are situations where backward prediction is very useful in increasing the compression rate. For example, in a scene in which a door opens, the current picture may predict what is behind the door based upon a future picture in which the door is already open.

B-pictures yield the most compression but also incorporate the most error. To eliminate error propagation, B-pictures may never be predicted from other B-pictures in the base layer. P-pictures yield less error and less compression. I-pictures yield the least compression, but are able to provide random access.

Thus, in the base layer, to decode P pictures, the previous I-picture or P-picture must be available. Similarly, to decode B pictures, the previous P or I and future P or I pictures must be available. Consequently, the video pictures are encoded and transmitted in dependency order, such that all pictures used for prediction are coded before the pictures predicted therefrom. When the encoded signal is received at a decoder, the video pictures are decoded and re-ordered for display. Accordingly, temporary storage elements are required to buffer the data before display.

The MPEG-2 standard for non-stereoscopic video signals does not specify any particular distribution that I-pictures, P-pictures and B-pictures must take within a sequence in a layer, but allows different distributions to provide different degrees of compression and random accessibility. One common distribution in the base layer is to have two B-pictures between successive I or P pictures. The sequence of pictures can be, for example, $I_1, B_1, B_2, P_1, B_3, B_4, I_2, B_5, B_6, P_2, B_7, B_8, I_3$, and so on. In the enhancement layer, a P-picture may be followed by three B-pictures, with an I-pictures being provided for every twelve P and B-pictures, for example, in the sequence $I_1, B_1, B_2, P_1, B_3, B_4, P_2, B_5, B_6, P_3, B_7, B_8, I_2$. Further details of the MPEG-2 standard can be found in document ISO/IEC JTC1/SC29/WG11 N0702, entitled "Information Technology—Generic Coding of Moving Pictures and Associated Audio, Recommendation H.262," Mar. 25, 1994, incorporated herein by reference.

FIG. 1 shows a conventional temporal and disparity video picture prediction scheme of the MPEG MVP system. The arrow heads indicate the prediction direction such that the picture which is pointed to by the arrow head is predicted based on the picture which is connected to the tail of the arrow. With a base layer (left view) sequence 150 of $I_b$ 155, $B_{b1}$ 160, $B_{b2}$ 165, $P_b$ 170, where the subscript "b" denotes the base layer, temporal prediction occurs as shown. Specifically, $B_{b1}$ 160 is predicted from $I_b$ 155 and $P_b$ 170, $B_{b2}$ 165 is predicted from $I_b$ 155 and $P_b$ 170, and $P_b$ 170 is predicted from $I_b$ 155. With an enhancement layer (right view) sequence 100 of $P_e$ 105, $B_{e1}$ 110, $B_{e2}$ 115, and $B_{e3}$ 120, where the subscript "e" denotes the enhancement layer, temporal and/or disparity prediction occurs. Specifically, $P_e$ 105 is disparity-predicted from $I_b$ 155. $B_{e1}$ 110 is both temporally-predicted from $P_e$ 105 and disparity-predicted from $B_{b1}$ 160. $B_{e2}$ 115 is temporally-predicted from $B_{e1}$ 110 and disparity-predicted from $B_{b2}$ 165. $B_{e3}$ 120 is temporally-predicted from $B_{e2}$ 115 and disparity-predicted from $P_b$ 170.

Generally, the base layer in the MPEG MVP system is coded according to the Main Profile (MP) protocol, while the enhancement layer is coded according to the MPEG-2 Temporal Scalability tools.

For fixed bandwidth stereoscopic video services, the output bitstream comprising the multiplex of the base and enhancement layers must not exceed a given bit rate or corresponding bandwidth. This result can be achieved with separate rate control schemes in the base and enhancement layers such that the bit rate for each layer does not exceed a given threshold, and the sum of the two bit rates satisfies the overall bandwidth requirement. Alternately, the bit rate in each layer can be allowed to vary as long as the combined bit rate meets overall bandwidth requirements.

Moreover, the rate control scheme should also provide a relatively constant video signal quality over all picture types (e.g., I, P and B pictures) in the enhancement layer and coincide with the Video Buffering Verifier (VBV) model in the MPEG MVP system. The VBV is a hypothetical decoder which is conceptually connected to the output of an encoder. Coded data is placed in the buffer at the constant bit rate that is being used, and is removed according to which data has been in the buffer for the longest period of time. It is required that the bitstream produced by an encoder or editor does not cause the VBV to either overflow or underflow.

With conventional systems, the quality of a P-picture in the enhancement layer can vary depending on whether it is temporally-predicted or disparity-predicted. For example, for a scene with the cameras panning to the right, with a constant quantization level, a P-picture temporally-predicted from a B-picture in the enhancement layer may have a lower quality than if it was disparity-predicted from an I-picture in the base layer. This is because, as mentioned, B-pictures yield the most compression but also incorporate the most error. In contrast, the quality of a base layer P-picture is maintained since a B-picture may not be used as a reference picture in the base layer. The quality of the P-picture image corresponds to the average quantization step size of the P-picture data.

Moreover, editing operations such as fast-forward and reverse may be performed at a decoder terminal in response to commands provided by a consumer. Such editing operations can result in an encoding error since the group of picture (GOP) or refresh period frames may be different in the base and enhancement layers, and their respective starting points may be temporally offset. The GOP consists of one or more consecutive pictures. The order in which the pictures are displayed usually differs from the order in which the coded versions appear in the bitstream. In the bitstream, the first frame in a GOP is always an I-picture. However, in display order, the first picture in a GOP is either an I-picture, or the first B-picture of the consecutive series of B-pictures which immediately precedes the first I-picture. Furthermore, in display order, the last picture in a GOP is always an I or P-picture.

Furthermore, a GOP header is used immediately before a coded I-frame in the bitstream to indicate to the decoder whether the first consecutive B-pictures immediately following the coded I-frame in the bitstream can be properly reconstructed in the case of a random access, where the I-frame is not available for use as a reference frame. Even when the I-frame is unavailable, the B-pictures can possibly be reconstructed using only backward prediction from a subsequent I or P frame.

When it is required to display a frame which does not immediately follow the GOP header, as during editing operations, synchronization between the base and enhancement layer frames may be destroyed. This can result in a discontinuity that leads to a frame freeze-up or other impairment in the resulting video image.

Accordingly, it would be advantageous to provide a rate control scheme for a stereoscopic video system such as the MPEG MVP system which adjusts the quantization level of P-pictures in the enhancement layer depending on whether the picture is being temporally or disparity-predicted. The scheme should further account for the complexity level of the encoded picture and the reference frame. The scheme should also account for data rate requirements during potential editing operations while providing a uniform image quality and avoiding frame freeze up. The present invention provides the above and other advantages.

SUMMARY OF THE INVENTION

In accordance with the present invention, a rate control method and apparatus are presented for use at an encoder on the transmitter side of a stereoscopic digital video communication system for modifying the quantization level of P or B-frame data in the enhancement layer depending on whether the frame is temporally predicted (from the same layer) or disparity predicted (from the opposite layer). The invention can maintain a consistent image quality by providing additional quantization bits for disparity-predicted P-pictures, for example, where a P-frame may be encoded from a B-frame in the base layer. The selected quantization level corresponds to an overall bit rate requirement of the enhancement layer, right_bit_rate, and a virtual buffer fullness parameter, Vr.

Furthermore, in many applications, it is necessary to re-encode decoded data for editing modes such as fast forward and fast rewind. In accordance with the present invention, when the reference frame in the base layer is the first frame of a GOP, the corresponding enhancement layer frame will be encoded as an I or P frame to improve image quality and eliminate error propagation during such potential editing modes. For example, if the enhancement layer frame in question was to be coded as a B-frame using a conventional picture distribution scheme, the picture type will be switched instead to a P or I-picture. Moreover, the rate control calculations at the transmitter will account for this possibility by reducing the allocated bits for the current picture in the enhancement layer to avoid a possible overflow of the virtual buffer at the encoder.

Moreover, for disparity predicted P-frames, the quantization step size can be modified according to the activity level of the frame being encoded in the enhancement layer, or of the reference frame in the base layer, whichever is greater.

DETAILED DESCRIPTION OF THE INVENTION

Figure 1:
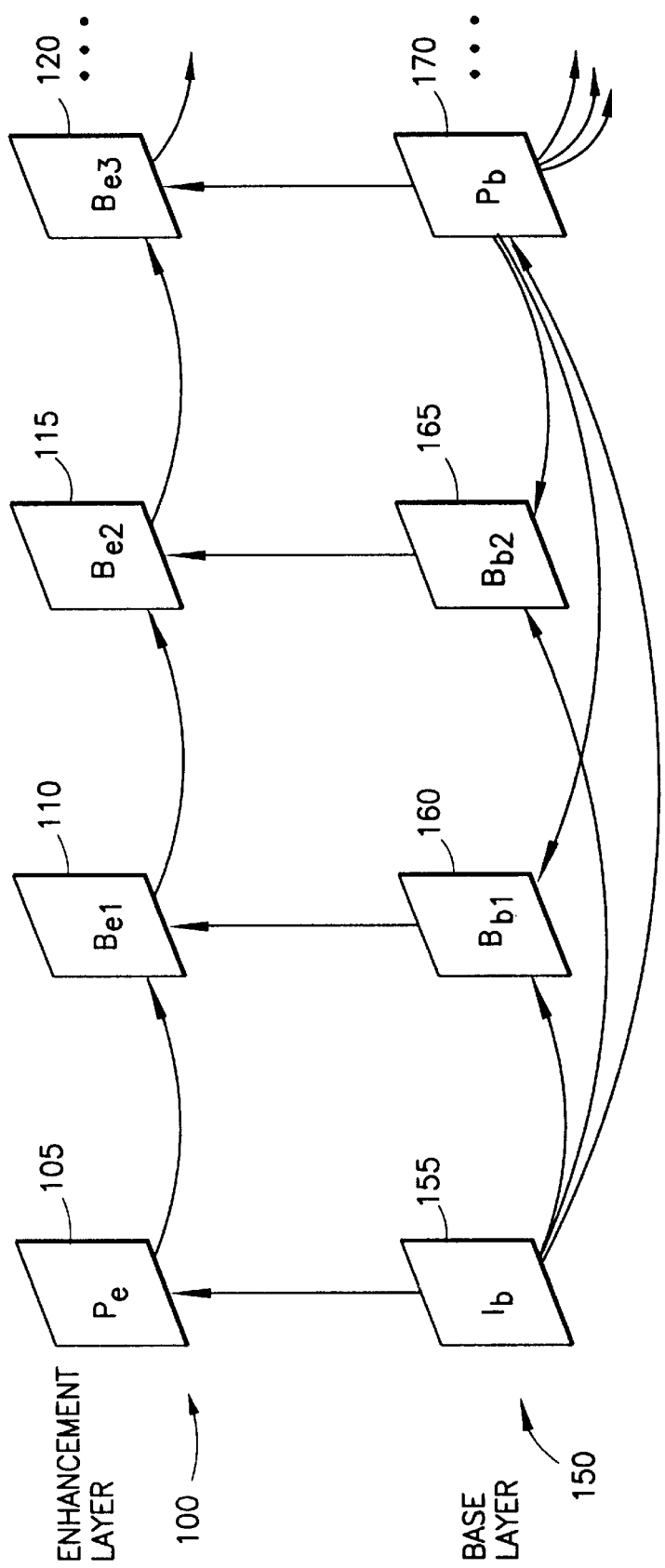
FIG. 1 shows the conventional temporal and disparity prediction scheme of the MPEG MVP system.

The rate control method of the present invention includes seven procedures, including parameter initialization, initialization for the enhancement layer, initialization and update for the refresh period or the group of pictures (GOP), pre-processing of the current picture, post-processing of the previous picture, macro-block task and slice task rate control processing, and adaptive quantization processing.

Parameters which are initialized for later use include the minimum allocated number of bits, $Tr_{min}$, for the frames corresponding to a GOP or a refresh period of the enhancement layer. $Tr_{min}$ is determined from $$Tr_{min} = \frac{\text{right\_bit\_rate}}{8 * \text{picture\_rate}}$$

where right_bit_rate is the allocated bit rate for the enhancement layer, and picture_rate is the picture rate of the stereoscopic signal, for example, 30 pictures/second for NTSC video, and 25 pictures/second for PAL video.

Furthermore, an initial complexity value, Kx, is assigned to the current picture in the enhancement layer. The selected quantization level of the current picture corresponds to the complexity level, such that a smaller quantization step size is used with a more complex picture, thereby yielding more encoded data bits. The initial complexity level is assigned depending on the type of picture. An I-picture is used as a random access reference picture and therefore should be quantized in relatively small steps. Thus, an I-picture has a relatively larger complexity level. P and B-pictures are assigned a lower initial value of complexity, and are therefore quantized more coarsely. Moreover, the complexity of a given picture can be determined either in the spatial domain or in the transform domain. Representative values are $Kx_I=1.39$, $KX_{DP}=0.52$, $Kx_{TP}=0.37$ and $Kx_B=0.37$, where the subscript "I" denotes an I-picture, "DP" denotes a disparity-predicted P-picture, "TP" denotes a temporally-predicted P-picture, and "B" denotes a B-picture. Additionally, the terms $P_D$ and $P_T$ will be used herein to indicate, respectively, a disparity-predicted P-picture and a temporally-predicted P-picture. The complexity parameters should satisfy the relationship $Kx_I > Kx_{DP} \geq Kx_{TP} \geq Kx_B$.

For a given picture type, the complexity value Kx is adjustable. A highly complex image will have larger variations in pixel luminance or chrominance values, for instance. In order to maintain a given image quality (e.g., resolution), the highly complex image must be encoded using additional bits compared to a less complex image. Accordingly, the complexity value of a given picture can be increased or decreased, respectively, if the picture is more or less complex than other pictures of the same type.

$Kr_{DP}$, $Kr_{TP}$, $Kr_B$, are initial virtual buffer fullness parameters for the predictive-coded frames (e.g., $P_D$, $P_T$ and B-frames) in the enhancement layer. For instance, $Kr_{DP}=1.0$, $Kr_{TP}=1.4$ and $Kr_B=1.4$ are suitable. These parameters are adjustable and should satisfy $Kr_{DP} < Kr_{TP} \leq Kr_B$. $Xr_{DP}$, $Xr_{TP}$ and $Xr_B$ are the complexities for $P_D$, $P_T$ and B-pictures, respectively, and are initially determined from the complexity parameters $Kx_{DP}$, $Kx_{TP}$ and $Kx_B$, respectively. Specifically, using the allocated bit rate for the enhancement layer, right_bit_rate, the desired bit rate for I-pictures is $Xr_I=Kx_I*\text{right\_bit\_rate}$. For $P_D$-pictures, $Xr_{DP}=Kx_{DP}*\text{right\_bit\_rate}$. For $P_T$-pictures, $Xr_{TP}=Kx_{TP}*\text{right\_bit\_rate}$. For B-pictures, $Xr_B=Kx_B*\text{right\_bit\_rate}$. Moreover, in case there are no I-frames in the enhancement layer, the allocated bit rate for the disparity-predicted P-pictures can be increased by the term $Xr_I/N_I$, where $N_I=\max\{Nr/\text{GOP\_length\_of\_left\_view}, 1\}$, Nr is the refresh period of the enhancement layer, as mentioned, and GOP_length_of_left_view is the number of frames in a group of pictures in the base layer. In this case, $Xr_{DP}=Kx_{DP}*\text{right\_bit\_rate}+Xr_I/N_I$. Regarding the GOP_length_of_left_view, consider a conventional picture distribution scheme in the base layer of $I_1$, $B_1$, $B_2$, $P_1$, $B_3$, $B_4$, $I_2$, $B_5$, $B_6$, $P_2$, $B_7$, $B_8$. In this case, GOP_length_of_left_view=12.

Next, the current picture type in the enhancement layer is determined. If the current picture is an I-picture, the virtual buffer fullness level is $Vr_j=10*RPr/31$. If the current picture is a disparity-predicted P-picture, the virtual buffer fullness level is $Vr_{DP}=10*RPr*Kr_{DP}/31$. For a temporally-predicted P-picture, the virtual buffer fullness level is $Vr_{TP}=10*RPr*Kr_{TP}/31$. For a B-picture, the virtual buffer fullness level is $Vr_B=Vr_{TP}=10*RPr*Kr_B/31$ since $Kr_{TP}=Kr_B$. The reaction parameter RPr is defined as RPr=2*right_bit_rate/picture_rate.

Figure 2:
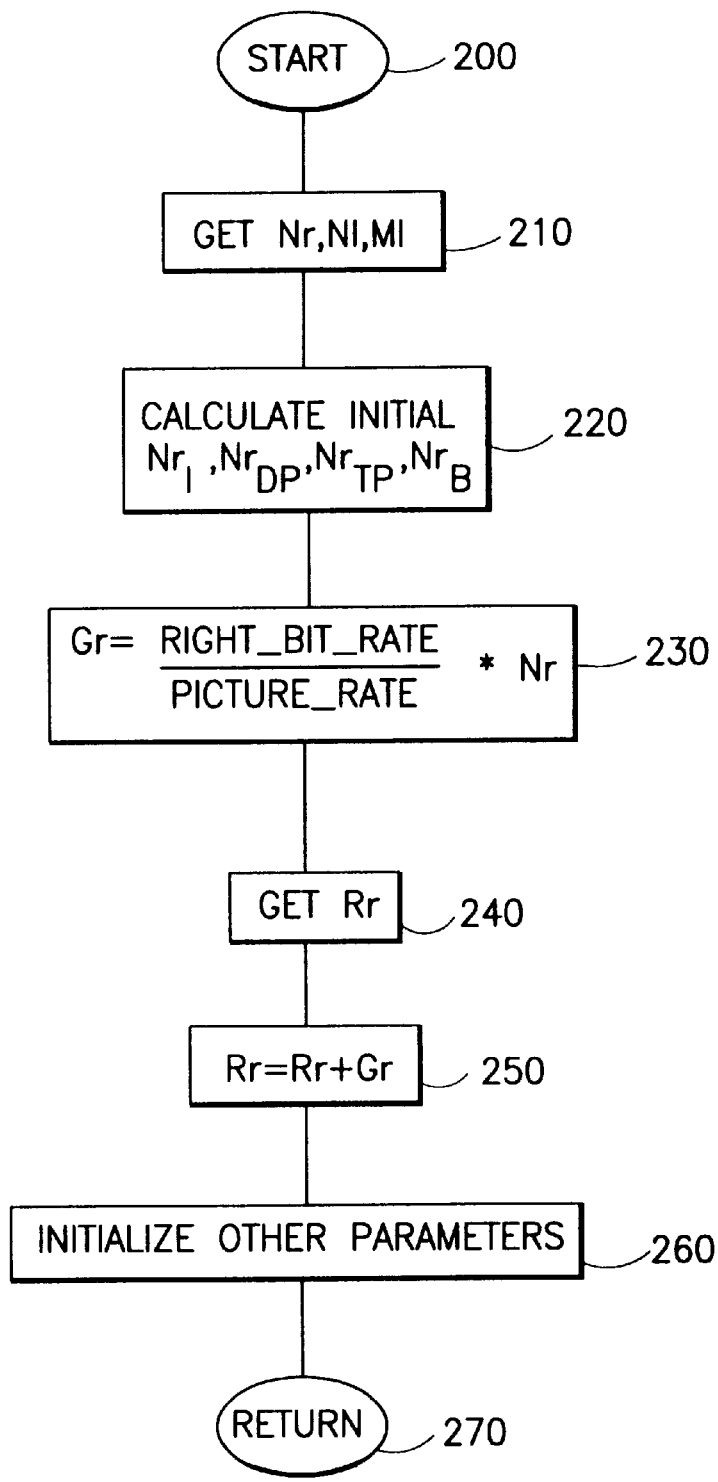
FIG. 2 shows the initial GOP or refresh period subroutine in accordance with the present invention.

The initialization for the enhancement layer will now be described. FIG. 2 shows the initial GOP or refresh period subroutine in accordance with the present invention. The routine begins at block 200. At block 210, the values Nr, Nl and Ml are retrieved. Nr is the number of pictures (e.g., length) in the refresh period or GOP of the enhancement (right view) layer. Nl is the GOP length of the base (left view) layer, and Ml denotes the configuration of picture types in the base layer. Specifically, for Ml=1, the base layer has only I and P-pictures. For Ml=2, the base layer has I, P, and B-pictures, with one B-picture between I or P pictures. For Ml=3, the base layer has I, P, and B-pictures, with two consecutive B-pictures between I or P pictures.

At block 220, the initial value of the number of I, P and B-pictures in the refresh period or GOP of the enhancement layer is calculated. $Nr_I$ is the number of I frames, $Nr_{DP}$ is the number of disparity-predicted P frames, $Nr_{TP}$ is the number of temporally-predicted P frames, and $Nr_B$ is the number of B-frames.

At block 230, the initial value of the remaining number of bits, Gr, in the refresh period or GOP of the enhancement layer is determined from $$Gr = \frac{\text{right\_bit\_rate}}{\text{picture\_rate}} * Nr.$$

At block 240, Rr, the remaining number of bits available for coding the remaining pictures in the refresh period or GOP, is retrieved. Rr is a running balance that is updated after each picture is encoded in the enhancement layer. The initial value of the remaining number of bits is Rr=0. At block 250, Rr is updated as Rr=Rr+Gr.

At block 260, other parameters are initialized as previously discussed, including $Tr_{min}$, Kx, Kr, Xr and Vr. At block 270, the routine ends.

The initialization and update for the refresh period or the group of pictures (GOP) will now be described. In the base layer, the refresh period is the interval between successive I-pictures in the sequence of encoded video frames, and defines the same pictures as the GOP. In the enhancement layer, the refresh period is the interval between successive I-pictures, if they are present, or between two pre-assigned disparity-predicted P-pictures (e.g., $P_D$-pictures). Pre-assigned means that the picture type is set in the enhancement layer before examining the base layer configuration. In accordance with the present invention, a pre-assigned picture type may be switched to another picture type before encoding. In the base layer, and in the enhancement layer when I-frames are used, the GOP header immediately precedes a coded I-frame in the packetized video bitstream to indicate whether the first consecutive B-pictures immediately following the coded I-frame can be properly reconstructed in the case of a random access. This situation may arise, for instance, during editing of a sequence of video frames at a decoder. When no I-frames are used in the enhancement layer, there is accordingly no GOP. Moreover, the GOP or refresh period used in the base and enhancement layers will typically have temporally offset starting and ending points. That is, the first frame of a GOP in the base layer will not necessarily coincide with the first frame of the refresh period of the enhancement layer. Similarly, the GOP or refresh period length (e.g., number of frames) also typically varies between the base and enhancement layers.

The fact that the base and enhancement layers may be offset and have different lengths can provide problems during editing modes such as fast forward and fast reverse. In fact, editing operations may result in loss of the enhancement layer or other visual impairment. Protocols such as MPEG-2 provide a syntactical hierarchy in the encoded bitstream that allow such editing functions. For instance, the bitstream can be encoded with various access points which allow processing and editing of corresponding portions of the base layer without the need to decode the entire video.

However, such access points in the base layer do not necessarily correspond to acceptable access points in the enhancement layer. For example, an access point is usually provided in the base layer where an I-picture is located. Since an I-frame provides a self-contained video frame image, subsequent frames in the base layer can be predicted using the I-picture. However, the I-frame in the base layer may coincide with a B-frame in the enhancement layer. In this case, subsequent pictures cannot be accurately predicted from the B-frame in the enhancement layer since a B-frame does not contain data from a full video frame.

In accordance with the present invention, an enhancement layer picture which is pre-defined as a B-picture is encoded instead as a $P_D$-picture when it is determined that the picture coincides with the first I-picture of a base layer GOP. That is, the picture type is switched. Thus, in the event that a random access is required in the base layer, the corresponding P-picture in the enhancement layer can be disparity predicted using the I-frame in the base layer in order to provide the information required to reconstruct the enhancement layer image. Alternatively, the enhancement layer picture can be encoded as an I-picture if sufficient bits are available, thereby providing synchronized random access for both the base and enhancement layers.

Moreover, at the decoder, errors can propagate in frames which are predicted from other frames due to quantization and other errors. Thus, it is necessary to periodically provide a new frame that is self-contained and does not depend on any other frame (such as an I-frame in the base layer), or that is directly predicted from an I-frame (such as a disparity-predicted P-frame in the enhancement layer). When such a frame is provided, the data stream is said to be refreshed since propagated errors are eliminated or reduced and a new baseline is established. For example, with a frame rate of 30 frames/second and with every eighth picture in the base layer being an I-picture, the refresh period is 8/30 second. The frames relating to a GOP header are said to span the refresh period.

Figure 3:
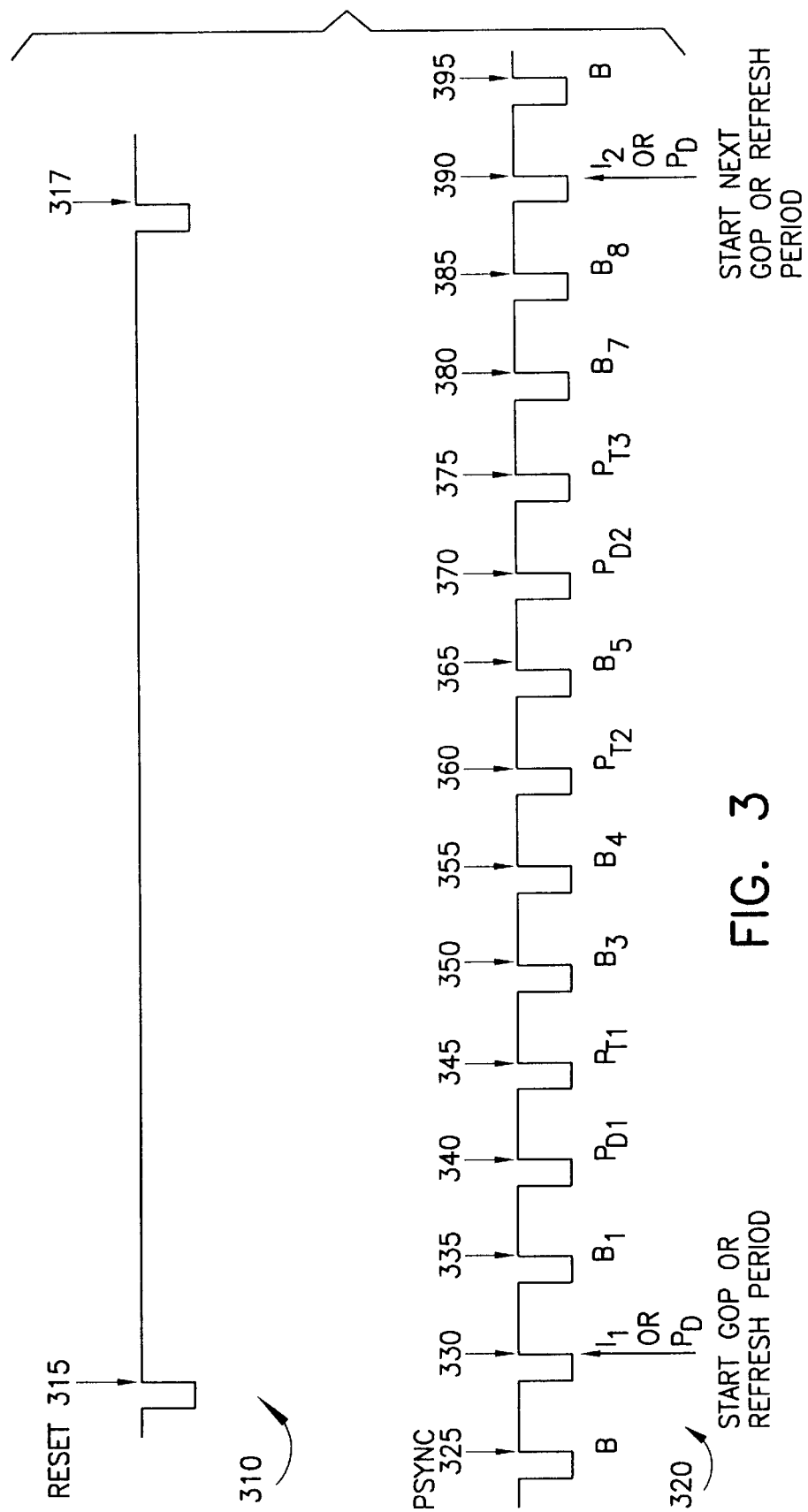
FIG. 3 shows the picture layer timing for the enhancement layer sequence in accordance with the present invention.

FIG. 3 shows the picture layer timing for the enhancement layer sequence in accordance with the present invention. The enhancement layer includes the sequence of frames $I_1$, $B_1$, $P_{D1}$ $P_{T1}$, $B_3$, $B_4$, $P_{T2}$, $B_5$, $P_{D2}$, $P_{T3}$, $B_7$, $B_8$ in the full GOP shown. The pictures $P_{D1}$ and $P_{D2}$ have replaced $B_2$ and $B_6$ (not shown), respectively. A reset signal 310 denotes the beginning of the coding sequence with a pulse 315. A pulse sync (PSYNC) signal 320 provides a train of pulses. Pulse 325 denotes the last frame (which is shown as a B-picture) in the previous GOP or refresh period. Pulse 330 denotes the first frame in the next GOP or refresh period. As mentioned, the GOP is defined when I-pictures are used in the enhancement layer. Otherwise, the refresh period defines the set of pictures which are to be coded with the allocated number of bits. The pictures of the refresh period are thus still grouped even if there is no GOP. Pulses 330 through 390 correspond to pictures $I_1$, $B_1$, $P_{D1}$, $P_{T1}$, $B_3$, $B_4$, $P_{T2}$, $B_5$, $B_6$, $P_{T3}$, $B_7$, $B_8$, $I_2$, respectively.

Pulse 390 indicates the start of another group of pictures or refresh period in the enhancement layer. In the example shown, the first frame to be encoded in the GOP or refresh period is either an I-picture or a $P_D$-picture, respectively. The next frame, denoted by pulse 335 is a B-picture. However, in accordance with the present invention, the next frame, denoted by pulse 340, has been switched from a B-picture (e.g., $B_2$) to a $P_D$-picture. Similarly, $P_{D2}$ denoted by pulse 370 has replaced another B-picture, $B_6$ (not shown). The last two frames of the GOP or refresh period are $B_7$ and $B_8$, as indicated by pulses 380 and 385, respectively. Following the reset signal pulse 317, another GOP or refresh period begins as indicated by pulse 390 with another I-picture or $P_D$-picture. Pulse 395 denotes a first B-picture of this GOP, and so forth.

Additionally, each of pulses 330–385 indicates the occurrence of post-processing of a previous picture, and pre-processing of the current picture. For example, assume there are no I-pictures in the enhancement layer. Thus, pulse 330 indicates that pre-processing of the current frame, which is to be encoded as a $P_D$-picture, begins. Also, at this time, post-processing of the B-picture indicated by pulse 325 commences. Similarly, pulse 335 indicates that pre-processing of the current frame, B, begins, and post-processing of the $P_D$-picture indicated by pulse 330 commences. The pre-processing and post-processing steps will be described below.

Figure 4:
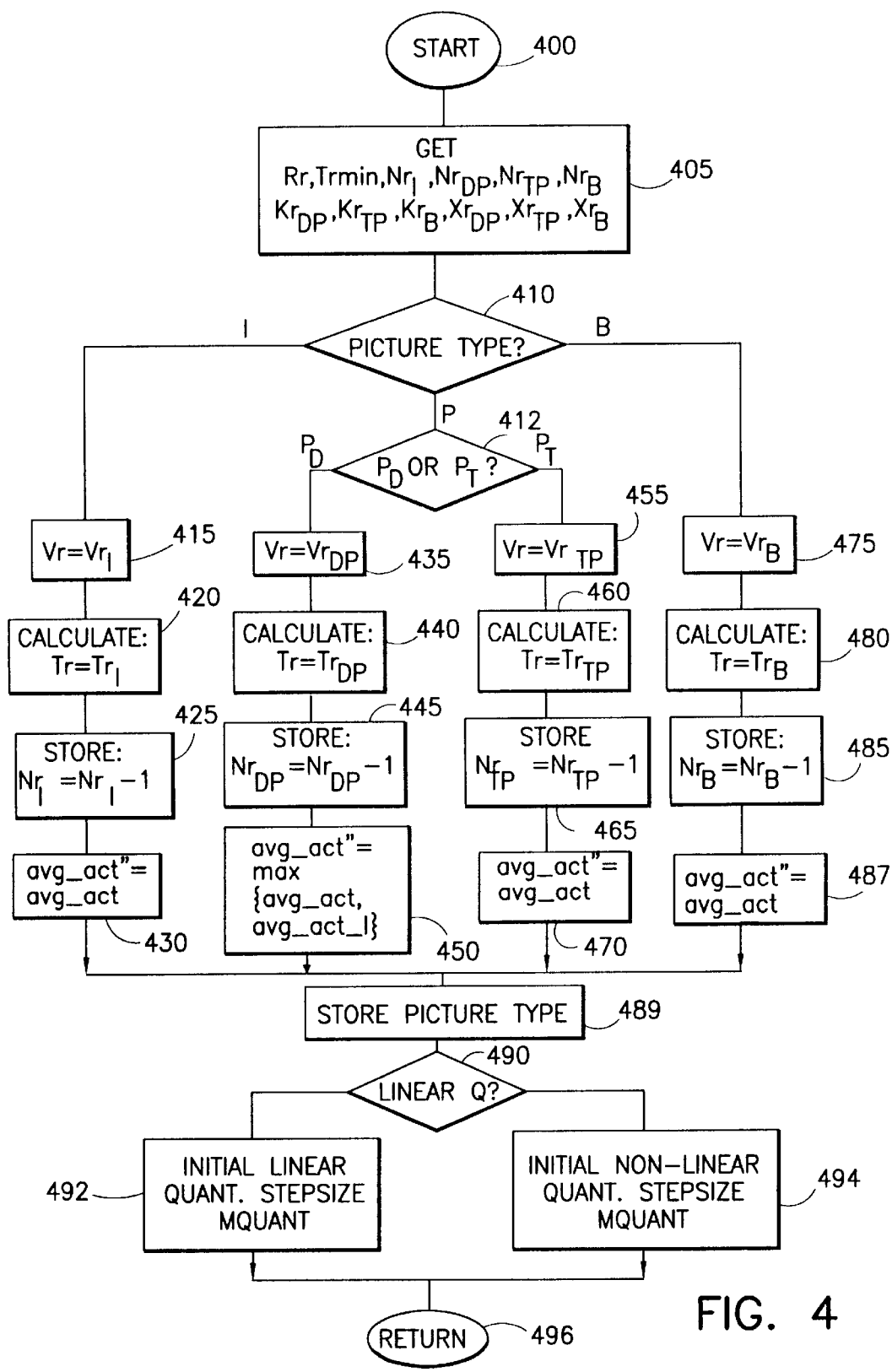
FIG. 4 shows the subroutine for pre-processing of the current picture in accordance with the present invention.

FIG. 4 shows the subroutine for pre-processing of the current picture in accordance with the present invention. The routine begins at block 400. At block 405, the parameters Rr, $Tr_{min}$, $Nr_I$, $Nr_{DP}$, $Nr_{TP}$, $Nr_B$, $Kr_{DP}$, $Kr_{TP}$, $Kr_B$, $Xr_{DP}$, $Xr_B$, and $Xr_{TP}$ are retrieved. Rr is the remaining number of bits which can be allocated for the frames of a GOP or refresh period of the enhancement layer. $Tr_{min}$, is the minimum allocated number of bits for a frame.

$Nr_I$, $Nr_{DP}$, $Nr_{TP}$, and $Nr_B$, are the number of I, $P_D$, $P_T$ and B-pictures, respectively, provided in a GOP or refresh period of the enhancement layer in accordance with the present invention. In a stereoscopic video signal, if the base layer coded frame is the first frame of the GOP, the corresponding frame in the enhancement layer should be coded as either an I or P-frame with the base layer frame as a reference frame. This factor should also be accounted for in the rate control calculations to ensure that the refresh period is configured correctly.

Figure 6:
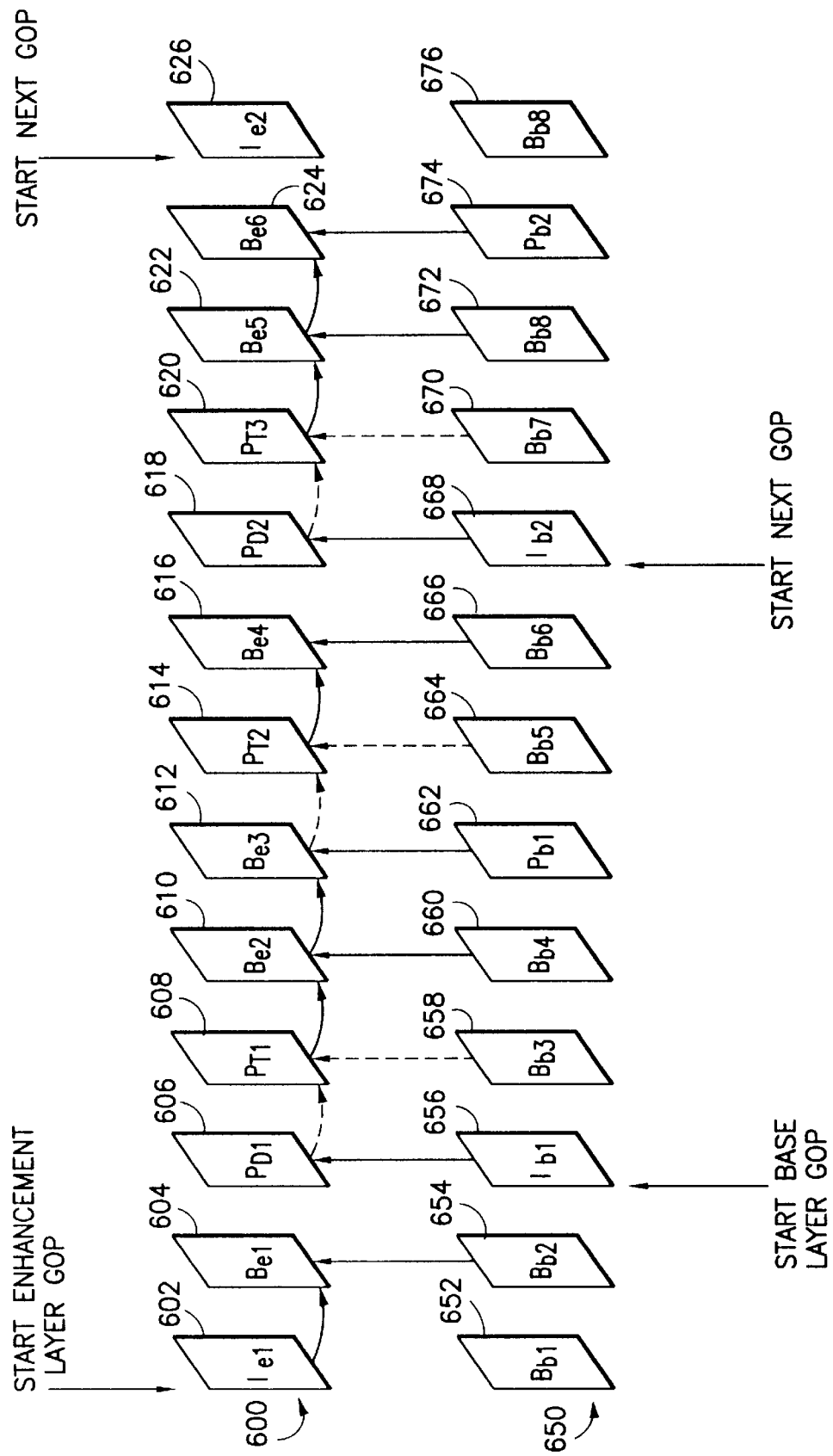
FIG. 6 shows a picture distribution configuration in accordance with the present invention.

For example, FIG. 6 shows a picture distribution configuration in accordance with the present invention. It should be understood that the example shown is only one of many possible picture distribution configurations. Pictures 602 to 626 are in the enhancement layer 600, and pictures 652 to 676 are in the base layer. The picture type is indicated in the picture. The subscript "e" when used denotes the enhancement layer, the subscript "b" denotes the base layer, and the numerical subscript is a sequential indicator. For example, picture $B_{e4}$ 616 is the fourth B-picture in the pictures of the enhancement layer which are shown. $P_D$ and $P_T$ indicate, respectively, a disparity-predicted P-picture and a temporally-predicted P-picture. Note that the pictures are shown in the order in which they are displayed.

Furthermore, the arrows shown which point to respective pictures in the enhancement layer indicate the type of encoding used for the picture. A solid arrow indicates that the picture pointed to is encoded using the picture at the tail of the arrow as a reference picture. For example, $B_{e1}$ 604 is encoded using both $I_{e1}$ 602 in the enhancement layer and $B_{b2}$ 654 in the base layer. A dashed arrow indicates an optional encoding choice. For example, picture 608 may be encoded using picture $P_{D1}$ 606 in the enhancement layer, in which case the picture is $P_{T1}$ or picture 608 may be encoded using picture $B_{b3}$ 658 in the base layer, in which case the picture is $P_D$. In accordance with the present invention, the option which meets a particular criteria can be selected. This criteria may reflect a minimized prediction error, or a desired bit allocation or image quality, for instance. In either case, the rate control scheme of the present invention accounts for the selected picture type.

Note also that while a P-Picture type has only one reference frame, a B-picture will typically have macroblocks being predicted from frames in both layers in an averaging process. For example, $B_{e3}$ 612 is predicted from both $B_{e2}$ 610 and $P_{b1}$ 662. Prediction modes in the base layer are not shown since they are conventional.

In the picture distribution and prediction mode configuration shown in FIG. 6, the enhancement layer includes I-pictures $I_{e1}$ 602 and $I_{e2}$ 626. Thus, a GOP of the enhancement layer includes the twelve pictures 602 through 624. Another GOP of the enhancement layer begins at $I_{e2}$ 626, but is not shown in full. A GOP of the base layer includes pictures $I_{b1}$ 656 to $B_{b6}$ 666. Another GOP of the base layer starts at picture $I_{b2}$ 668, but is not shown in full. Note that the twelve pictures $B_{b1}$ 652 through $P_{b2}$ 674 in the base layer correspond to the GOP of the enhancement layer. In this base layer sequence of twelve pictures, there are two I-pictures at the start of base layer GOPs. In accordance with the present invention, the pictures in the enhancement layer which correspond to these base layer I-pictures are switched to a different picture type for coding. Specifically, picture $P_{D1}$ 606, which corresponds to picture $I_{b1}$ 656 in the base layer, has been switched. Similarly, picture $P_{D2}$ 618, which corresponds to picture $I_{b2}$ 668 in the base layer, has been switched. Formerly, in a conventional picture distribution scheme, pictures $P_{D1}$ 606 and $P_{D2}$ 618 were B-pictures. In an alternative embodiment, the enhancement layer pictures which correspond to the start of GOP pictures in the base layer can be switched to I-pictures. Switching a B-picture to either a P or I-picture in the enhancement layer in the manner disclosed provide advantages during editing modes, when random access in the base and enhancement layers may be required.

Thus, in the example of FIG. 6, $Nr_I=1$, $Nr_{DP}=2$, $Nr_{TP}=3$, and $Nr_B=6$ in the GOP of the enhancement layer which spans pictures $I_{e1}$ 602 to $B_{e6}$ 624. Additionally, $Nr=12$ since there are twelve pictures in the enhancement (right) layer GOP, $Nl=6$ since there are six pictures in the base (left) layer GOP, and $Ml=3$ since there are two consecutive B-pictures between I or P pictures in the base layer.

Returning now to FIG. 4, at block 410, the current picture type in the enhancement layer is determined. Depending on the picture type, one of four different branches in FIG. 4 will be followed. If the current picture is an I-picture, the virtual buffer fullness level $Vr_I$ is determined at block 415. If the current picture is a P-picture picture, the type of P-picture is determined at block 412. For a disparity-predicted P-picture, the virtual buffer fullness level $Vr_{DP}$ is determined at block 435. For a temporally-predicted P-picture, the virtual buffer fullness level $Vr_{TP}$ is determined at block 455. For a B-picture, the virtual buffer fullness level $Vr_B$ is determined at block 475.

Next, the current picture in the enhancement layer that is being coded is pre-processed to determine a "target" bit allocation, Tr, which is the estimated number of bits available to code the next picture. Moreover, bit allocation is made over a number of frames which are defined by the GOP or refresh period. Accordingly, it is also necessary to know how many frames, and which type, comprise the GOP or refresh period. In particular, when the newly coded frame is an I-picture, at block 420, $$Tr_I = \max\left\{\frac{Rr}{Nr_I + \frac{Nr_{DP}*Xr_{DP}}{Kr_{DP}*Xr_I} + \frac{Nr_{TP}*Xr_{TP}}{Kr_{TP}*Xr_I} + \frac{Nr_B*Xr_B}{Kr_B*Xr_I}}, Tr_{\min}\right\}.$$

For a disparity-predicted P-picture, at block 440, $$Tr_{DP} = \max\left\{\frac{Rr}{Nr_{DP} + Kr_{DP}*\frac{Nr_I*Xr_I}{Xr_{DP}} + Kr_{DP}*\frac{Nr_{TP}*Xr_{TP}}{Kr_{TP}*Xr_{DP}} + Kr_{DP}*\frac{Nr_B*Xr_B}{Kr_B*Xr_{DP}}}, Tr_{\min}\right\}.$$

For a temporally-predicted P-picture, at block 460, $$Tr_{TP} = \max\left\{\frac{Rr}{Nr_{TP} + Kr_{TP}*\frac{Nr_I*Xr_I}{Xr_{TP}} + Kr_{TP}*\frac{Nr_{DP}*Xr_{DP}}{Kr_{DP}*Xr_{TP}} + Kr_{TP}*\frac{Nr_B*Xr_B}{Kr_B*Xr_{TP}}}, Tr_{\min}\right\}.$$

For a B-picture, at block 480, $$Tr_B = \max\left\{\frac{Rr}{Nr_B + Kr_B*\frac{Nr_I*Xr_I}{Xr_B} + Kr_B*\frac{Nr_{DP}*Xr_{DP}}{Kr_{DP}*Xr_B} + Kr_B*\frac{Nr_{TP}*Xr_{TP}}{Kr_{TP}*Xr_B}}, Tr_{\min}\right\}.$$

When the current frame is coded as a certain picture type, the number of remaining pictures of that type needed in the enhancement layer can be reduced by one. Thus, for I pictures, at block 425, $Nr_I$ is decremented by one and stored. Corresponding actions occur for $Nr_{DP}$, $Nr_{TP}$ and $Nr_B$ at blocks 445, 465 and 485, respectively.

If the current picture is a $P_D$-picture, then, in accordance with the present invention, a new average activity level avg_act" is defined at block 450. avg_act indicates the average activity of the previous frame in the enhancement layer, and can be determined either in the spatial domain, as with the MPEG Test Model 5 system, or in the transform domain, as with some MPEG-2 systems. Further details of Test Model 5 can be found in document ISO/IEC JTC1/SC29/WG11, AVC-491, Version 1, entitled "Test Model 5," April 1993, incorporated herein by reference.

Conventionally, the quantization level of a frame being encoded is determined based on the activity level of only the reference frame. However, this may produce a reduced image quality if the current frame has a higher activity level than the reference frame. For a $P_D$-picture, the reference frame would be in the base (left) layer, with an average activity of avg_act_1. In accordance with the present invention, for $P_D$-pictures, the maximum of the average activity levels of the previous frame and the reference frame is used. Thus, the new average activity level is avg_act"=max{avg_act, avg_act_}.

Alternatively, when the system has frame buffers, avg_act of an encoded frame in the enhancement layer can be pre-computed and stored. That is, for the current frame being encoded, the average activity can be computed from the current picture itself.

For I, $P_T$ and B-pictures, at blocks 430, 470 and 487, respectively, the average activity level is avg_act"=avg_act.

At block 489, the current picture type is stored for later retrieval in the post-processing of the previous picture. At 490, a determination is made as to whether linear or non-linear quantization is to be used. For linear quantization, the initial quantization step size for use in quantizing both the scaled DC and AC coefficients in the current frame is derived from the macro-block quantization parameter, MQUANT, which is determined at block 492 as $$MQUANT = \max\left\{2, \min\left\{\frac{Vr*62}{RPr}, 62\right\}\right\}.$$

As discussed, Vr is the virtual buffer fullness level, and RPr is the reaction parameter. For a non-linear quantization scale, at block 494, $$MQUANT = \max\left\{1, \min\left\{\text{non\_linear\_mquant\_table}\left[\frac{Vr*31}{RPr}\right], 112\right\}\right\}$$

where non_linear_mquant_table is the output of a look-up table with an input of Vr*31/RPr.

The routine ends at block 496.

Figure 5:
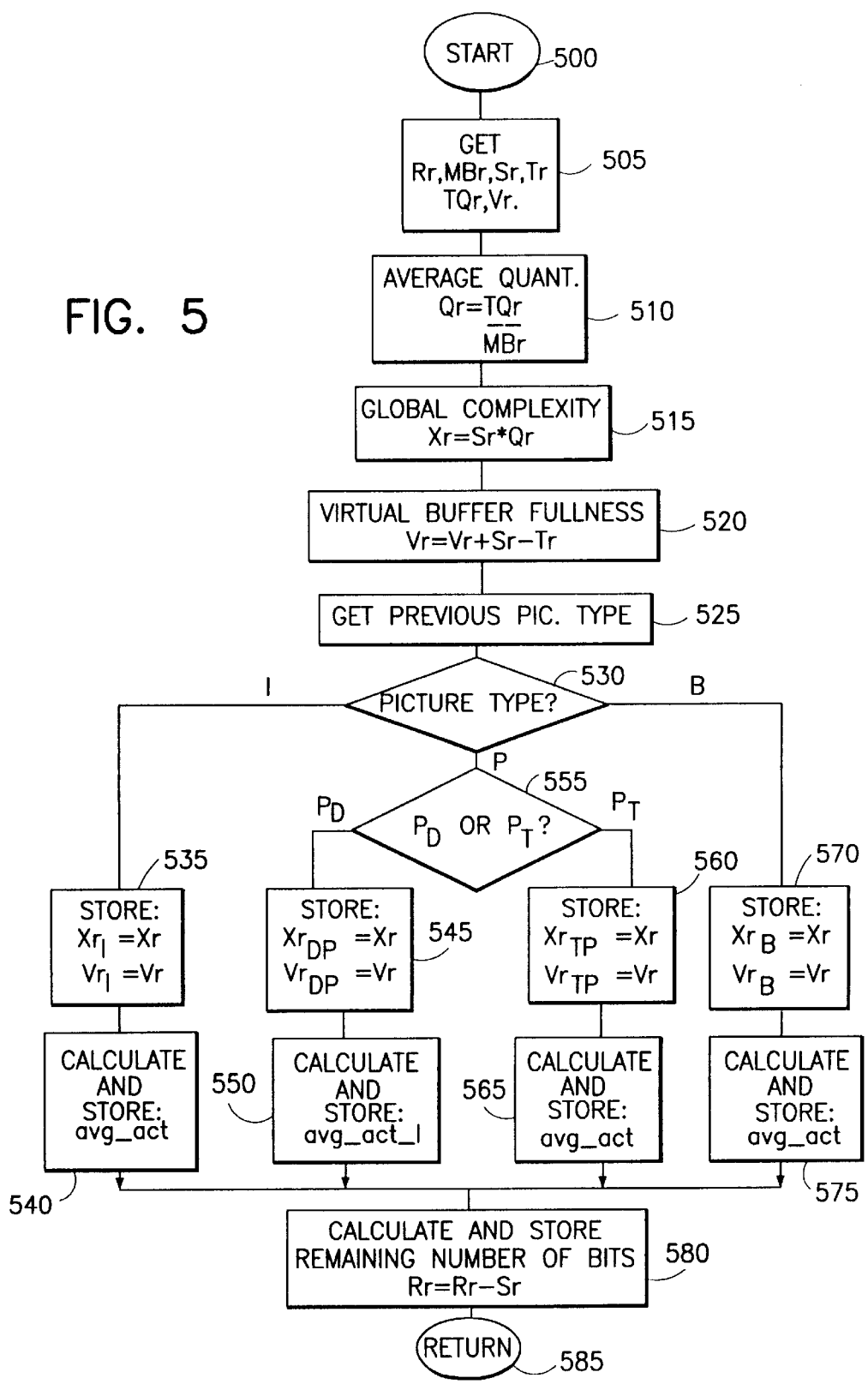
FIG. 5 shows the subroutine for post-processing of the previous picture in accordance with the present invention.

FIG. 5 shows the subroutine for post-processing of the previous picture in accordance with the present invention. At block 505, the parameters Rr, MBr, Sr, Tr, TQr and Vr are retrieved. Rr is the remaining number of bits which can be allocated for the frames of a GOP or refresh period in the enhancement layer after the current frame has been encoded. MBr is the number of macro-blocks in a frame. Sr is the number of bits in a previous picture in the enhancement layer, and does not include stuff bits, which are dummy bits inserted before a start code in the data stream. Tr is the number of bits allocated for coding the current frame. TQr is the accumulation of MQUANT for the previous picture. Vr is the virtual buffer fullness level.

At block 510, the average quantization parameter, Qr, is calculated. If the next picture is a $P_D$-picture, $Qr_{DP}$=$TQr_{DP}$/MBr. Otherwise, Qr=TQr/MBr.

At block 515, a global complexity level, Xr, is determined. If the next picture is a $P_D$-picture, the global complexity is Xr=$Sr_{DP}$*$Qr_{DP}$. Otherwise, Xr=Sr*Qr.

At block 520, the virtual buffer fullness level, Vr, is updated by taking the previous buffer fullness level, adding the number of bits in the previous picture, Sr, and subtracting the number of bits allocated to the current picture, Tr.

At block 525, the previous picture type is retrieved. If the previous picture in the enhancement layer is an I-picture, $Xr_I$ and $Vr_I$ are set and stored at block 535. If the previous picture is a $P_D$-picture as determined at block 555, $Xr_{DP}$ and $Vr_{DP}$ are set and stored at block 545. If the previous picture is a $P_T$-picture as determined at block 555, $Xr_{TP}$ and $Vr_{TP}$, are set and stored at block 560. If the previous picture is a B-picture, $Xr_B$ and $Vr_B$ are set and stored at block 570.

Next, the average activity is calculated and stored for the I, $P_D$, $P_T$ and B-pictures at blocks 540, 550, 565 and 575, respectively, as discussed in connection with blocks 430, 450, 470 and 487 of FIG. 4.

Next, at block 580, the remaining number of bits which can be allocated for the frames of the GOP or refresh period of the enhancement layer is updated by subtracting the number of bits in the previous picture in the enhancement layer, Sr.

The routine ends at block 585.

The macro-block task and slice task rate control processing will now be discussed. In the MPEG-2 system, rate control is based in part on the macro-block level and slice level of a video frame. For instance, with an NTSC format, a video frame may be divided into thirty slices, each of which has forty-four macro-blocks. Thus, an entire NTSC frame comprises 1,320 macro-blocks. With a PAL format, there are 1,584 macro-blocks.

For macro-block based rate control, let Bm(j) represent the number of bits in the jth macro-block in the current picture, for j=1 to 1,320. Abm(j) is the number of accumulated bits up to the jth macro-block in the current picture. MBr is the number of macroblocks in the picture. A macro-block virtual buffer discrepancy, d(j) is determined from $$d(j) = Vr + ABm(j) - \frac{j*Tr}{MBr}.$$

The reference quantization parameter for the jth macro-block is $$Q(j) = \frac{d(j)*31}{RPr}.$$

For slice level rate control, Bs(j) is the number of bits in the jth slice in the current picture, for j=1 to 30. Abs(j) is the accumulated number of bits up to the jth slice in the current picture. No_slice is the number of slices in the picture. The slice virtual buffer discrepancy is ds(j), where $$ds(j) = Vr + ABs(j) - \frac{j*Tr}{No\_Slice}.$$

The reference quantization parameter for the jth slice is $$Qs(j) = \frac{ds(j)*31}{RPr}.$$

Adaptive quantization processing will now be discussed. First, the activity of the jth macro-block, act(j), is computed. If the current picture is a disparity prediction mode P-picture, the normalized activity of the jth macro-block, N_act(j), is computed as $$N\_act(j) = \frac{2*act(j) + avg\_act''}{act(j) + 2*avg\_act''}.$$

For other types of P-pictures, $$N\_act(j) = \frac{2*act(j) + avg\_act}{act(j) + 2*avg\_act}.$$

With macro-block level rate control, the quantization step size for the jth macro-block is computed as follows. For a linear Q scale, MQUANT(j)=max{2,min{Q(j)* N_act(j),62}}.

For a non-linear quantization scale,

MQUANT(j)=max{1,min{non_linear_mquant_table[Q(j)* N_act(j)],112}}.

where non_linear_mquant_table is the output of a look-up table with an input of Q(j)*N_act(j).

With slice level rate control, Qs(j) is substituted for Q(j), so that for a linear Q scale, MQUANT(j)=max{2,min{Qs(j)* N_act(j),62}}.

and for a non-linear quantization scale,

MQUANT(j)=max{1, min{non_linear_mquant_table[Qs(j)* N_act(j)],112}} where non_linear_mquant_table is the output of a look-up table with an input of Qs (j) *N_act (j).

Accordingly, it can be seen that the present invention provides a rate control scheme for a stereoscopic digital video communication system which modifies the quantization level of P or B-frame data in the enhancement layer depending on whether the frame is temporally predicted (from the same layer) or disparity predicted (from the opposite layer). Furthermore, the quantization step size can be modified according to the activity level of the frame being encoded in the enhancement layer, or of the reference frame in the base layer, whichever is greater. Moreover, image quality is improved and frame freeze up is prevented during editing modes by encoding the enhancement layer frame as an I or P frame when the reference frame in the base layer is the first frame of a group of pictures (GOP).

Although the invention has been described in connection with various specific embodiments, those skilled in the art will appreciate that numerous adaptations and modifications may be made thereto without departing from the spirit and scope of the invention as set forth in the claims.

What is claimed is:

1. A rate control method for a stereoscopic digital data signal having a base layer and an enhancement layer, wherein first and second reference pictures are available for use in coding at least a portion of a current picture of the enhancement layer, comprising the steps of:

selecting one of said first and second reference pictures for use in coding said at least a portion of said current picture according to a selection criteria;

wherein the first reference picture precedes the current picture in the enhancement layer and the second reference picture is concurrent with the current picture in the base layer;

calculating a first number of bits to allocate in coding said at least a portion of said current picture according to whether said first or second reference picture is selected in said selecting step;

calculating a quantization step size for coding said at least a portion of said current picture according to said first number of bits;

and coding said current picture as a disparity-predicted P-picture when said second reference picture is a first picture of a group of pictures of said base layer.

2. A method according to claim 1, comprising the further steps of:

calculating an initial number of bits to allocate for coding a group of pictures of the enhancement layer that comprises the current picture; and maintaining a running total of remaining bits available as each of said pictures in said group is coded;

wherein said calculating of said first number of bits is responsive to said running total.

3. A method according to claim 1, wherein:

said calculating of said first number of bits is responsive to a desired data rate of said stereoscopic digital data signal.

4. A method according to claim 1, wherein:

said current picture is a disparity-predicted picture ($P_D$-picture); and said calculating of said first number of bits increases said first number of bits when there are no intra-coded pictures (I-pictures) in said enhancement layer according to a ratio of a refresh period of the enhancement layer and a number of frames in a group of pictures of the base layer.

5. A method according to claim 1, wherein said second reference picture is selected in said selecting step, comprising the further steps of:

determining a first activity level which is an activity level of at least a portion of a picture which precedes said current picture in said enhancement layer; and determining a second activity level which is an activity level of at least a portion of said second reference picture;

wherein:

said calculating of said first number of bits is responsive to the greater of said first and second activity levels.

6. A method according to claim 1, wherein said second reference picture is selected in said selecting step, comprising the further steps of:

determining a first activity level which is an activity level of at least a portion of a picture which precedes said current picture in said enhancement layer; and determining a second activity level which is an activity level of at least a portion of said second reference picture; wherein:

said calculating of said first number of bits is responsive to an average of said first and second activity levels.

7. A method according to claim 1, comprising the further steps of:

pre-computing and storing a value indicating a first activity level which is an activity level of said at least a portion of said current picture prior to when said at least a portion of said current picture is to be coded;

retrieving said value for use in coding said at least a portion of said current picture; and determining a second activity level which is an activity level of at least a portion of whichever of said first and second reference pictures is selected in said selecting step; wherein:

said calculating of said first number of bits is responsive to the greater of said first and second activity levels.

8. A method according to claim 1, comprising the further steps of:

pre-computing and storing a value indicating a first activity level which is an activity level of said at least a portion of said current picture prior to when said at least a portion of said current picture is to be coded;

retrieving said value for use in coding said at least a portion of said current picture; and determining a second activity level which is an activity level of at least a portion of whichever of said first and second reference pictures is selected in said selecting step; wherein:

said calculating of said first number of bits is responsive to an average of said first and second activity levels.

9. A method according to claim 1, wherein:

said selection criteria is to provide a minimized prediction error for said current picture.

10. A method according to claim 1, wherein:

said selection criteria is to provide a desired bit allocation for said current picture.

11. A method according to claim 1, wherein:

said selection criteria is to provide a desired image quality for said current picture.

12. A method according to claim 1, wherein:

said current picture has a pre-assigned B-picture type which is switched in said coding step.

13. An apparatus for rate control of a stereoscopic digital data signal having a base layer and an enhancement layer, wherein first and second reference pictures are available for use in coding at least a portion of a current picture of the enhancement layer, comprising:

means for selecting one of said first and second reference for use in coding said at least a portion of said current picture according to a selection criteria;

wherein the first reference picture precedes the current picture in the enhancement layer and the second reference picture is concurrent with the current picture in the base layer;

means for calculating a first number of bits to allocate in coding said at least a portion of said current picture according to whether said first or second reference picture is selected by said selecting means;

means for calculating a quantization step size for coding said at least a portion of said current picture according to said first number of bits;

and means for coding said current picture as a disparity-predicted P-picture when said second reference picture is a first picture of a group of pictures of said base layer.

14. An apparatus according to claim 13, comprising:

means for calculating an initial number of bits to allocate for coding a group of pictures of the enhancement layer that comprises the current picture; and means for maintaining a running total of remaining bits available as each of said pictures in said group is coded;

wherein said means for calculating said first number of bits is responsive to said running total.

15. An apparatus according to claim 13, wherein:

said means for calculating said first number of bits is responsive to a desired data rate of said stereoscopic digital data signal.

16. An apparatus according to claim 13, wherein:

said current picture is a disparity-predicted picture ($P_D$-picture); and said means for calculating said first number of bits increases said first number of bits when there are no intra-coded pictures (I-pictures) in said enhancement layer according to a ratio of a refresh period of the enhancement layer and a number of frames in a group of pictures of the base layer.

17. An apparatus according to claim 13, wherein said second reference picture is selected by said selecting means, further comprising:

means for determining a first activity level which is an activity level of at least a portion of a picture which precedes said current picture in said enhancement layer; and means for determining a second activity level which is an activity level of at least a portion of said second reference picture;

wherein said means for calculating said first number of bits is responsive to the greater of said first and second activity levels.

18. An apparatus according to claim 13, wherein said second reference picture is selected by said selecting means, further comprising:

means for determining a first activity level which is an activity level of at least a portion of a picture which precedes said current picture in said enhancement layer; and means for determining a second activity level which is an activity level of at least a portion of said first reference picture;

wherein said means for calculating said first number of bits is responsive to an average of said first and second activity levels.

19. An apparatus according to claim 13, comprising:

means for pre-computing and storing a value indicating a first activity level which is an activity level of said at least a portion of said current picture prior to when said at least a portion of said current picture is to be coded;

means for retrieving said value for use in coding said at least a portion of said current picture; and means for determining a second activity level which is an activity level of at least a portion of whichever of said first and second reference pictures is selected by said selecting means;

wherein said means for calculating said first number of bits is responsive to the greater of said first and second activity levels.

20. An apparatus according to claim 13, comprising:

means for pre-computing and storing a value indicating a first activity level which is an activity level of said at least a portion of said current picture prior to when said at least a portion of said current picture is to be coded;

means for retrieving said value for use in coding said at least a portion of said current picture; and means for determining a second activity level which is an activity level of at least a portion of whichever of said first and second reference pictures is selected by said selecting means;

wherein said means for calculating said first number of bits is responsive to an average of said first and second activity levels.

21. An apparatus according to claim 13, wherein:

said selection criteria is to provide a minimized prediction error for said current picture.

22. An apparatus according to claim 13, wherein:

said selection criteria is to provide a desired bit allocation for said current picture.

23. An apparatus according to claim 13, wherein:

said selection criteria is to provide a desired image quality for said current picture.

24. An apparatus according to claim 13, wherein:

said current picture has a pre-assigned B-picture type which is switched by said coding means.

* * * * *